US010105888B2

United States Patent
Oono (10) Patent No.: US 10,105,888 B2
(45) Date of Patent: Oct. 23, 2018

(54) INJECTION MOLDING MACHINE WITH EJECTOR AND EJECTOR OPERATING METHOD FOR INJECTION MOLDING MACHINE

(71) Applicant: FANUC Corporation, Yamanashi (JP)

(72) Inventor: Hajime Oono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 309 days.

(21) Appl. No.: 15/048,391

(22) Filed: Feb. 19, 2016

(65) Prior Publication Data

US 2016/0257046 A1    Sep. 8, 2016

(30) Foreign Application Priority Data

Mar. 6, 2015 (JP) .................................. 2015-44990

(51) Int. Cl.
*B29C 45/76* (2006.01)

(52) U.S. Cl.
CPC .. *B29C 45/7626* (2013.01); *B29C 2945/7608* (2013.01); *B29C 2945/76083* (2013.01); *B29C 2945/76113* (2013.01); *B29C 2945/76117* (2013.01); *B29C 2945/76244* (2013.01); *B29C 2945/76418* (2013.01); *B29C 2945/76568* (2013.01); *B29C 2945/76598* (2013.01); *B29C 2945/76602* (2013.01); *B29C 2945/76722* (2013.01); *B29C 2945/76896* (2013.01)

(58) Field of Classification Search
CPC . B29C 45/40; B29C 45/4005; B29C 45/7626; B29C 2945/76083; B29C 2945/76086; B29C 2945/7609; B29C 2945/76096; B29C 2945/7611; B29C 2945/76113; B29C 2945/7624; B29C 2945/76244; B29C 2945/76418; B29C 2945/76568; B29C 2945/76571; B29C 2945/76575; B29C 2945/76581; B29C 2945/76595; B29C 2945/76602; B29C 2945/76896
USPC ................. 264/40.1, 334; 425/139, 556, 444
See application file for complete search history.

(56) References Cited

U.S. PATENT DOCUMENTS

2008/0003320 A1* 1/2008 Saito .................... B29C 45/4005
                                                               425/139
2013/0259962 A1* 10/2013 Sato ........................ B29C 45/80
                                                               425/150

FOREIGN PATENT DOCUMENTS

| JP | 61-249723 A | 11/1986 |
| JP | 3-270920 A | 12/1991 |
| JP | 9-174642 A | 7/1997 |
| JP | 10-286857 A | 10/1998 |
| JP | 2000-326371 A | 11/2000 |

(Continued)

OTHER PUBLICATIONS

JP2000326371A Machine Translation JAP to ENG (Year: 2000).*
Office Action in JP Application No. 2015-044990, dated Mar. 28, 2017.

*Primary Examiner* — Seyed Masoud Malekzadeh
*Assistant Examiner* — Lawrence D. Hohenbrink, Jr.
(74) *Attorney, Agent, or Firm* — Hauptman Ham, LLP (57) ABSTRACT

An acceleration distance for acceleration at a set acceleration rate, required for an ejection start position passing speed in an ejection start position, is obtained, and a position behind the ejection start position by the acceleration distance is set as an advance start position of an ejector. Thus, an ejector plate can start to move at an optimal speed.

5 Claims, 6 Drawing Sheets

CASE OF X1 ≧ X2
FIG. 4A CONVENTIONAL EJECTOR OPERATION
EJECTOR OPERATION OF INVENTION

(56) References Cited

FOREIGN PATENT DOCUMENTS

| | | | |
|---|---|---|---|
| JP | 2000326371 A | * | 11/2000 |
| JP | 2005-14430 A | | 1/2005 |
| JP | 2005-219420 A | | 8/2005 |
| JP | 2006-130693 A | | 5/2006 |
| JP | 2008-6785 A | | 1/2008 |

* cited by examiner

PRE-EJECTION STATE

EJECTOR EJECTION
START POSITION

FIG. 2B
(Prior Art)

MID-EJECTION STATE

FIG. 2C
(Prior Art)

STATE FOR EJECTION
ADVANCE LIMIT

EJECTOR ADVANCE
LIMIT POSITION

FIG. 3A

PRE-EJECTION STATE

EJECTOR ADVANCE
START POSITION

FIG. 3B

MID-EJECTION STATE

CASE OF X ≧ X2
FIG. 4A CONVENTIONAL EJECTOR OPERATION
FIG. 4B EJECTOR OPERATION OF INVENTION

CASE OF X < X2
FIG. 5A CONVENTIONAL EJECTOR OPERATION
FIG. 5B EJECTOR OPERATION OF INVENTION

INJECTION MOLDING MACHINE WITH EJECTOR AND EJECTOR OPERATING METHOD FOR INJECTION MOLDING MACHINE

RELATED APPLICATIONS

The present application claims priority to Japanese Patent Application Number 2015-44990, filed Mar. 6, 2015, the disclosure of which is hereby incorporated by reference herein in its entirety.

BACKGROUND OF THE INVENTION

Field of the Invention

The present invention relates to an injection molding machine with an ejector and an ejector operating method for the injection molding machine.

Description of the Related Art

In general, mold opening/closing operation and ejector advancing/retracting operation, which are mold operations of an injection molding machine, are performed based on previously input settings when predetermined operation start conditions are satisfied by sequence control during continuous molding operation.

A mold has a through-hole defined between a mold mounting surface and an ejector plate. An ejector device, such as an ejector rod, of the injection molding machine can be directly advanced through the through-hole. Further, a return spring is attached to the ejector plate.

In position condition setting for ejector operation of the injection molding machine, it is common to set a position in which the ejector plate is completely retracted by the return spring so that the ejector plate and the ejector device of the injection molding machine are just disengaged from each other.

Japanese Patent Application Laid-Open No. 2000-326371 discloses a technique in which an ejector device of an injection molding machine is operated at a higher speed before ejector pins abut against a mold than while an ejector plate is urging the mold to advance.

In the technique disclosed in Japanese Patent Application Laid-Open No. 2000-326371, the ejector device is certainly operated at a high speed before the ejector pins abut against the mold. Since the speed at which the ejector plate urges the mold to advance is a conventional speed, however, the overall rate of time reduction may be low in some cases.

If the set command speed for an ejector is simply increased in order to reduce the ejector operating time, moreover, the set speed sometimes cannot be reached when the advance distance of the ejector is short.

SUMMARY OF THE INVENTION

Accordingly, the object of the present invention is to provide an injection molding machine capable of sufficiently reducing the operating time of an ejector, thereby improving the mold release properties of molded articles.

An injection molding machine with an ejector according to the present invention comprises ejector operating condition setting means for setting an advance limit position of the ejector, an ejection start position at which the ejector starts to eject a molded article, and a standard advance speed for the ejection of the ejector, acquisition means for acquiring a set acceleration rate and a set deceleration rate of the ejector, and ejector operation mode setting means for setting an operation mode of the ejector. The ejector operation mode setting means obtains, as an ejection start position passing speed, a passing speed in the ejection start position which enables the ejector to be decelerated at the deceleration rate and stop at the advance limit position, based on a deceleration distance as a moving distance covered by the ejector advancing at the standard advance speed from the start of the deceleration at the deceleration rate until the ejector stops, an ejection distance between the ejection start position and the advance limit position, and the standard advance speed. An acceleration distance for acceleration at the acceleration rate to the ejection start position passing speed is obtained. A position behind the ejection start position by the acceleration distance is set as an advance start position of the ejector.

Thus, an ejector plate can start to move at an optimal speed. Further, the time elapsed from the start of advance of the ejector plate until the ejector plate stops at a predetermined position can be made as short as possible. Furthermore, the ejector can be reliably stopped at its advance limit position.

The ejector operation mode setting means may be configured to compare the deceleration distance and the distance between the ejection start position and the advance limit position, set a speed equal to the standard advance speed as the ejection start position passing speed if the distance between the ejection start position and the advance limit position is longer than or equal to the deceleration distance, and obtain the ejection start position passing speed from the deceleration rate and the distance between the ejection start position and the advance limit position if the distance between the ejection start position and the advance limit position is shorter than the deceleration distance.

Thus, the time elapsed from the start of advance of the ejector plate until the ejector plate stops at the predetermined position can be made as short as possible, and the ejector can be reliably stopped at its advance limit position.

The injection molding machine may comprise a display device configured to display the acceleration distance and a time required for movement for the acceleration distance.

Thus, an operator can ascertain optimal ejector advance timing and adjust molding conditions to the ejector advance timing.

An ejector operating method for an injection molding machine with an ejector comprises steps of setting, as ejector operating conditions, an advance limit position of the ejector, an ejection start position at which the ejector starts to eject a molded article, and a standard advance speed for the ejection of the ejector, acquiring a set acceleration rate and a set deceleration rate of the ejector, obtaining, as an ejection start position passing speed, a passing speed in the ejection start position which enables the ejector to be decelerated at the deceleration rate and stop at the advance limit position, based on a deceleration distance as a moving distance covered by the ejector advancing at the standard advance speed from the start of the deceleration at the deceleration rate until the ejector stops, an ejection distance between the ejection start position and the advance limit position, and the standard advance speed, obtaining an acceleration distance for acceleration at the acceleration rate to the ejection start position passing speed, and setting a position behind the ejection start position by the acceleration distance as an advance start position of the ejector.

Thus, an ejector plate can start to move at an optimal speed. Further, the time elapsed from the start of advance of the ejector plate until the ejector plate stops at a predetermined position can be made as short as possible. Furthermore, the ejector can be reliably stopped at its advance limit position.

The deceleration distance and the distance between the ejection start position and the advance limit position may be compared, a speed equal to the standard advance speed may be set as the ejection start position passing speed if the distance between the ejection start position and the advance limit position is longer than or equal to the deceleration distance, and the ejection start position passing speed may be obtained from the deceleration rate and the distance between the ejection start position and the advance limit position if the distance between the ejection start position and the advance limit position is shorter than the deceleration distance.

Thus, the time elapsed from the start of advance of the ejector plate until the ejector plate stops at the predetermined position can be made as short as possible, and the ejector can be reliably stopped at its advance limit position.

According to the present invention, there can be provided an injection molding machine capable of sufficiently reducing the operating time of an ejector, thereby improving the mold release properties of molded articles.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
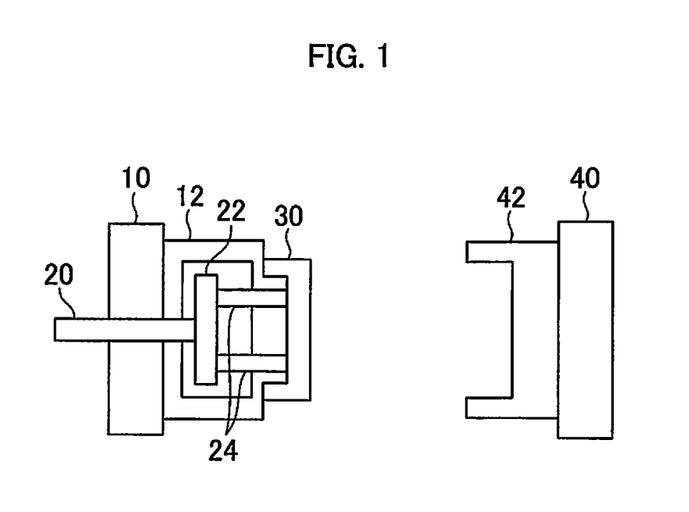
FIG. 1 is a view showing the vicinity of a movable platen and a fixed platen of an injection molding machine with an ejector used in the present invention.

Embodiments of the present invention will now be described with reference to the accompanying drawings. FIG. 1 is a view showing the vicinity of a movable platen and a fixed platen of an injection molding machine with an ejector used in the present invention. A fixed mold 42 and a movable mold 12 are mounted on a fixed platen 40 and a movable platen 10, respectively. Further, the movable platen 10 is provided with an ejector device for ejecting a molded article 30.

The ejector device comprises an ejector rod 20, ejector plate 22, and ejector pins 24. The ejector rod 20 is provided penetrating the movable platen 10 and is movable in directions (to the left and right in FIG. 1) to eject the molded article and return. The ejector plate 22 is provided separately from the ejector rod 20. The ejector plate 22 can move in the direction (to the right in FIG. 1) to eject the molded article as it is contacted and pressed by the ejector rod 20. A spring (not shown) is disposed between the ejector plate 22 and the movable mold 12. When the ejector rod 20 ceases to press the ejector plate 22, the ejector plate 22 is allowed to move back (to the left in FIG. 1) by the elasticity of the spring. The ejector pins 24 are secured to the ejector plate 22. As the ejector plate 22 is pressed by the ejector rod 20, the ejector pins 24 directly contact the molded article 30, thereby ejecting the molded article 30.

In the injection molding machine constructed in this manner, the molds are closed by the movable platen 10 to the right of FIG. 1. Then, a molten resin is injected into the fixed mold 42 from behind the fixed platen (or from the right side in FIG. 1) by an injection device (not shown). Thereafter, an additional force is applied to the movable platen 10 and the movable mold 12 to close the molds, and the molten resin is solidified to form the molded article 30. Thereafter, the molds are opened by moving the movable platen 10 and the movable mold 12 to the left in FIG. 1. After the mold opening is completed, the molded article is ejected by moving the ejector rod 20, ejector plate 22, and ejector pins 24 in an ejection direction (to the right in FIG. 1).

Figure 2A:
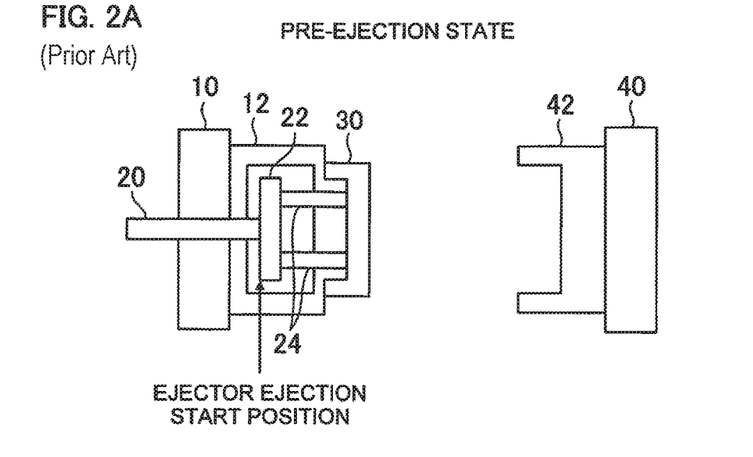
FIG. 2A is a view showing a pre-ejection state in a flow of a conventional ejecting operation.
Figure 2B:
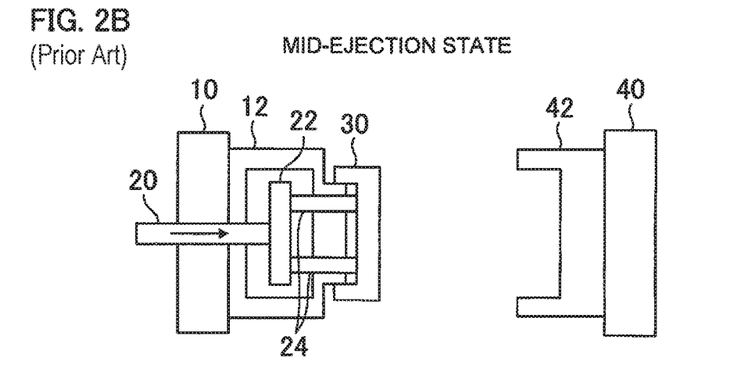
FIG. 2B is a view showing a mid-ejection state in the flow of the conventional ejecting operation.
Figure 2C:
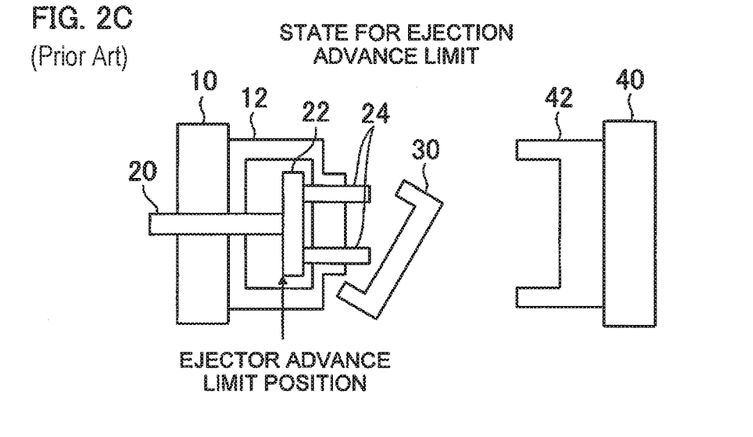
FIG. 2C is a view showing a state for an ejection advance limit in the flow of the conventional ejecting operation.

FIGS. 2A to 2C are views showing a flow of a conventional ejecting operation. FIG. 2A shows a pre-ejection state indicative of a position in which the ejector rod 20 abuts against the ejector plate 22 so that the ejector plate 22 starts to advance. In this state, the ejector rod 20 and the ejector plate 22 move in the ejection direction (to the right in FIG. 1) to start ejection. FIG. 2B shows a mid-ejection state. If the ejection is continued thereafter, the state of FIG. 2C is established. FIG. 2C shows a state for an ejection advance limit, in which the molded article 30 is ejected and dropped.

Figure 4A:
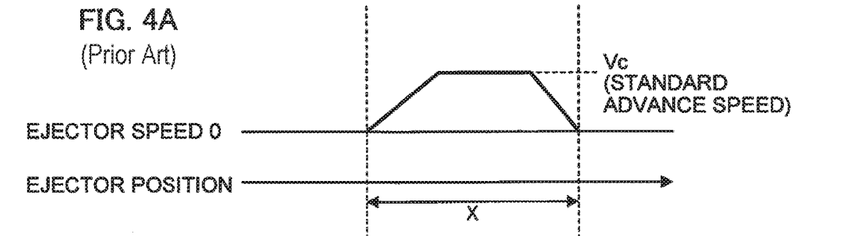
FIG. 4A is a diagram showing the relationship between the speed and position of a conventional ejector for a case where the advance distance of the ejector is equal to or longer than a deceleration distance.

FIG. 4A shows an example of the relationship between the ejector position and the ejector speed in the conventional ejecting operation described above. In the conventional ejecting operation, the pre-ejection state represents the position in which the ejector rod 20 abuts against the ejector plate 22 so that the ejector plate 22 starts to advance. In this state, the ejector speed at the start of the ejection is zero, and the ejection is performed as the ejector is accelerated. Possibly, therefore, the operation of the ejector may take a lot of time.

Accordingly, in the present embodiment, the ejector speed at the start of the ejection is set to a predetermined value such that the time for the ejector operation can be minimized.

In the above description, the direction in which the molded article 30 is released from the movable mold 12 is assumed to be a forward direction.

Figure 3A:
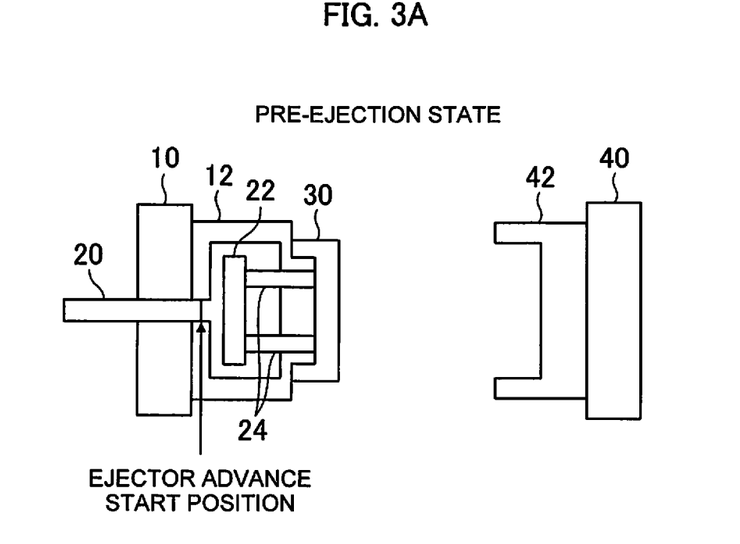
FIG. 3A is a view showing a pre-ejection state in a flow of an ejecting operation according to an embodiment of the present invention.
Figure 3B:
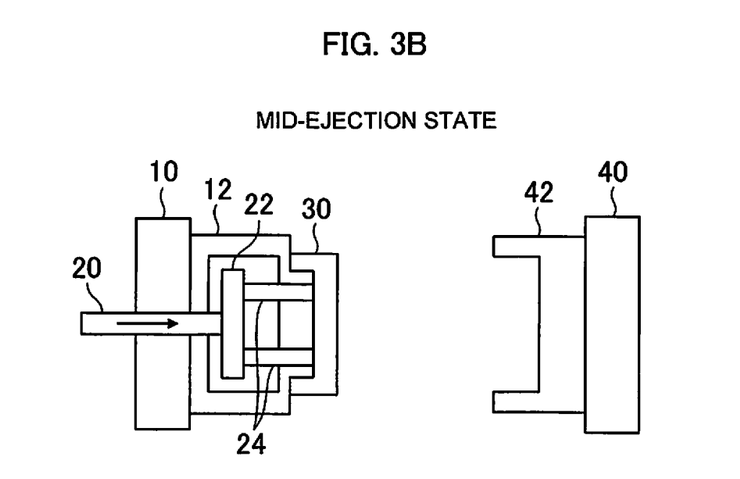
FIG. 3B is a view showing a state in the mid-ejection state in the flow of the ejecting operation according to the embodiment of the present invention.

FIGS. 3A and 3B are views showing a flow of an ejecting operation according to the present embodiment. FIG. 3A shows a pre-ejection state. The ejector rod 20 is separated from the ejector plate 22 so that it starts to move at a point on the left of the ejector plate 22 in FIG. 3. The ejector rod 20 abuts against the ejector plate 22 at a predetermined speed, thereby moving the ejector plate 22 to start the ejection. Thereupon, the speed of the ejector plate 22 at the start of the ejection is not zero, and the ejection is started at the predetermined speed, so that the time for the ejector operation can be reduced. FIG. 3B shows a mid-ejection state thereafter. Except for the ejector speed, this state is the same as the half-ejected state of the prior art shown in FIG. 2B. A method for setting the detailed ejector speed and the advance start position of the ejector rod 20 according to the present embodiment will be described later.

Let us assume that an advance distance (distance between an ejection start position and an advance limit position) of the ejector is X, a preset standard advance speed of the ejector is Vc, an acceleration rate used in an acceleration phase is a1, and a deceleration rate used in a deceleration phase is a2. These values, which can be ascertained at the time of machine design based on the performance of a drive unit and a motor of the injection molding machine, are stored in a storage device of a controller for the injection molding machine.

Instead of storing the above values in advance in the storage device, moreover, an operator may set the values by inputting them using input means (not shown) or the like. When the advance of the ejector is controlled by torque and thrust, the upper limit distance for the advance of the ejector and the upper limit value of the advance speed of the ejector can be set as X and Vc, respectively. In an electric injection molding machine using a servomotor as a driver, these parameters can easily be ascertained. Also in an injection molding machine using hydraulic or pneumatic pressure as a drive source, the parameters can be previously ascertained by an experiment or the like based on performance evaluation/confirmation at the design stage of the injection molding machine. Instead of storing these values in advance in the storage device, furthermore, the operator may set the values by inputting them using an input device or the like.

If the distance (deceleration distance) for which the ejector moves before it stops after speed reduction from the standard advance speed Vc at the deceleration rate a2 is X2 when the ejector accelerates or decelerates at a constant rate, X2 is given as follows:

$$X2 = Vc^2/(2 \times a2).$$

If molding is performed in the same conditions, X2 may be detected by information on a preceding molding cycle.

In the electric injection molding machine using the servomotor as the driver, the distance covered before the speed starts to be reduced during the advance of the ejector or the ejector stops since the input of a deceleration command can be detected by signals from a position detector attached to the servomotor. Independently of the servomotor, moreover, the position detector may be previously attached to the ejector or the mold so that position information can be fed back from the position detector to the injection molding machine.

The following is a case-by-case description of methods for setting an ejection start position passing speed and an advance start position at each ejection start position.

Figure 4B:
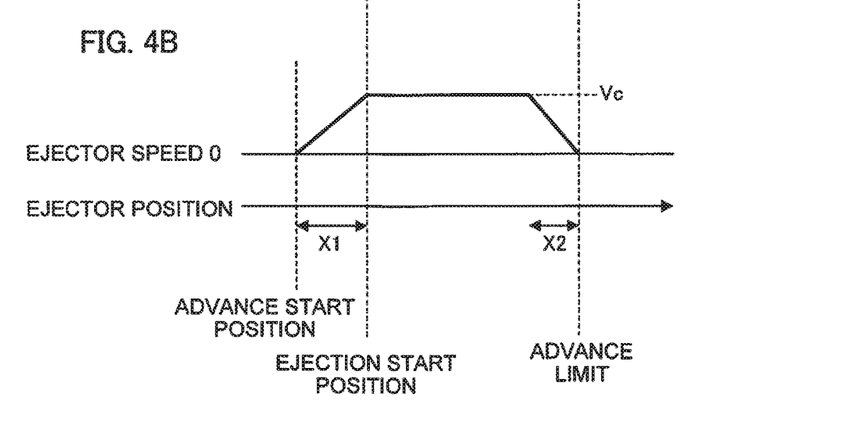
FIG. 4B is a diagram showing the relationship between the speed and position of the ejector of the present invention for a case where the advance distance of the ejector is equal to or longer than a deceleration distance.

FIGS. 4A and 4B show a case where the advance distance X of the ejector is equal to or longer than the deceleration distance X2. As mentioned before, FIG. 4A shows the relationship between the ejector speed and the ejector position for the case of the conventional ejector operation. FIG. 4B shows the relationship between the ejector speed and the ejector position according to the present embodiment. In either case, the ejector can be stopped at the advance limit position by starting the deceleration at the distance X2 on the near side from the advance limit position of the ejector even when the ejector is moving at the standard advance speed Vc.

In the conventional ejector operation, as shown in FIG. 4A, the deceleration is started at the point X2 short of the advance limit position of the ejector, and the ejector is stopped at the advance limit position. Since the acceleration is started from a speed of zero in the ejection start position, it takes time before the standard advance speed Vc is reached, so that the ejector operation may possibly be time-consuming.

In the present embodiment, as shown in FIG. 4B, the ejector is previously accelerated so that the standard advance speed Vc is reached in the ejection start position.

Specifically, a distance X1 required for acceleration from the speed of zero to the speed Vc based on the acceleration rate a1 is given by $$X1 = Vc^2/(2 \times a1),$$

so that a position behind the ejection start position by the distance X1 is set as the advance start position at which the ejector starts to advance.

Generally, in the ejector device, the mass of the ejector rod 20 is much larger than those of the ejector plate 22 and the ejector pins 24. If the ejector rod 20 abuts against the ejector plate 22 at the speed Vc in the ejector ejection start position, the ejector rod 20, ejector plate 22, and ejector pins 24 operate at the speed Vc. If the difference between the mass of the ejector rod 20 and the masses of the ejector plate 22 and the ejector pins 24 is not very large and influences the speed after the abuttal, however, the acceleration is performed so that the speed of the ejector rod 20 in the ejector ejection start position is not lower than Vc in consideration of that condition. The speed may be set so that the ejector rod 20, ejector plate 22, and ejector pins 24 move at the speed Vc after the abuttal.

When the ejector is expected to start advancing, it is accelerated at the acceleration rate a1 as it advances from the advance start position. Thus, the ejector speed is the standard advance speed Vc in the ejection start position. More specifically, the ejection start position passing speed is designed to become equal to the standard advance speed Vc if the advance distance X of the ejector is equal to or longer than the deceleration distance X2, as shown in FIGS. 4A and 4B. The deceleration is started at the point X2 short of the advance limit position of the ejector, and the ejector is stopped at the advance limit position.

Figure 7:
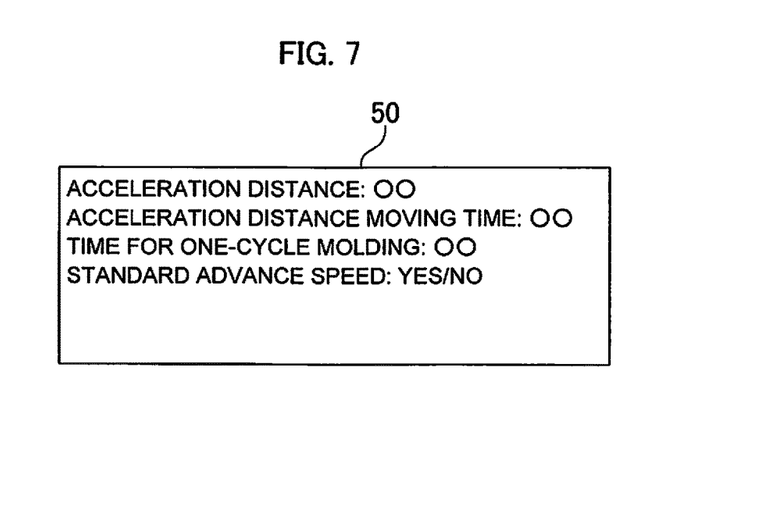
FIG. 7 is a diagram showing an example of display on a display device.

When this is done, the distance X1 from the advance start position to the ejection start position, the value of a time t ($=\sqrt{(2X1/a1)}$) required for movement for the distance X1, and an actual value obtained by one-cycle molding can be displayed on an operation screen or a display device 50 attached to the injection molding machine, as shown in FIG. 7.

Figure 5A:
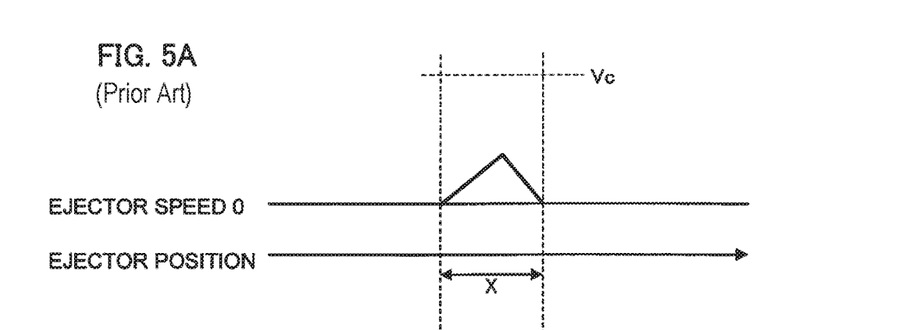
FIG. 5A is a diagram showing the relationship between the speed and position of the conventional ejector for a case where the advance distance of the ejector is shorter than the deceleration distance.
Figure 5B:
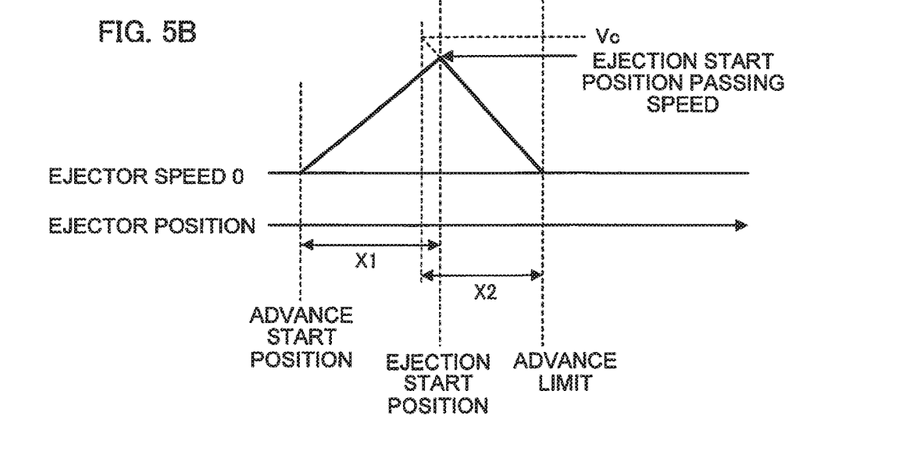
FIG. 5B is a diagram showing the relationship between the speed and position of the ejector of the present invention for a case where the advance distance of the ejector is shorter than the deceleration distance.

Referring now to FIGS. 5A and 5B, there will be described a case where the advance distance X of the ejector is shorter than the deceleration distance X2. FIG. 5A shows the relationship between the ejector speed and the ejector position for the case of the conventional ejector operation. FIG. 5B shows the relationship between the ejector speed and the ejector position according to the present embodiment. In either case, the ejector cannot be stopped at its advance limit position even when it is decelerated at the deceleration rate a2 if its advance speed is increased to the standard advance speed Vc during the period of ejection.

In the conventional ejector operation, as shown in FIG. 5A, therefore, the acceleration is performed at the acceleration rate a1 up to a point of intersection of the relationship established between the ejector speed and the ejector position when the acceleration is started from the speed of zero at the acceleration rate a1 in the ejection start position and the relationship between the ejector speed and the ejector position such that the ejector can stop at its advance limit position when it is decelerated at the deceleration rate a2. Thereafter, the deceleration is performed at the deceleration rate a2. In this case, however, the acceleration is started from the speed of zero in the ejection start position, so that the time for the acceleration is short, and the attainable speed is low. Possibly, therefore, the ejector operation may be time-consuming.

In the present embodiment, as shown in FIG. 5B, the ejector is previously accelerated so that it can reach a speed in its ejection start position such that it can stop at its advance limit position when it is decelerated at the deceleration rate a2 for the distance from the ejection start position to the advance limit position.

Specifically, if the ejection start position passing speed is Vt, we have $X = Vt^2/(2 \times a2)$ and hence $Vt = \sqrt{(2 \times a2 \times X)}$, and an acceleration distance $X1'$ can be given by $$X1' = Vt^2/(2 \times a1) = (2 \times a2 \times X)/(2 \times a1) = a2 \times X/a1.$$

Based on this, a position behind the ejection start position by the distance $X1'$ ($=a2 \times X/a1$) is set as the advance start position at which the ejector starts to advance.

When the ejector is expected to start advancing, it is accelerated at the acceleration rate a1 as it advances from the advance start position. Thus, the ejector speed is the ejection start position passing speed Vt in the ejection start position. Thereafter, the deceleration is started at the deceleration rate a2 and the ejector stops at the advance limit position.

In this case, as in the case where the advance distance X of the ejector is equal to or longer than the deceleration distance X2, the distance $X1'$ from the advance start position to the ejection start position, the value of a time t ($=\sqrt{(2X1'/a1)}$) required for movement for the distance $X1'$, and an actual value obtained by one-cycle molding can be displayed on the operation screen or the display device attached to the injection molding machine. In addition, a message to the effect that the standard advance speed Vc cannot be reached during the ejector operation may be displayed.

Figure 6:
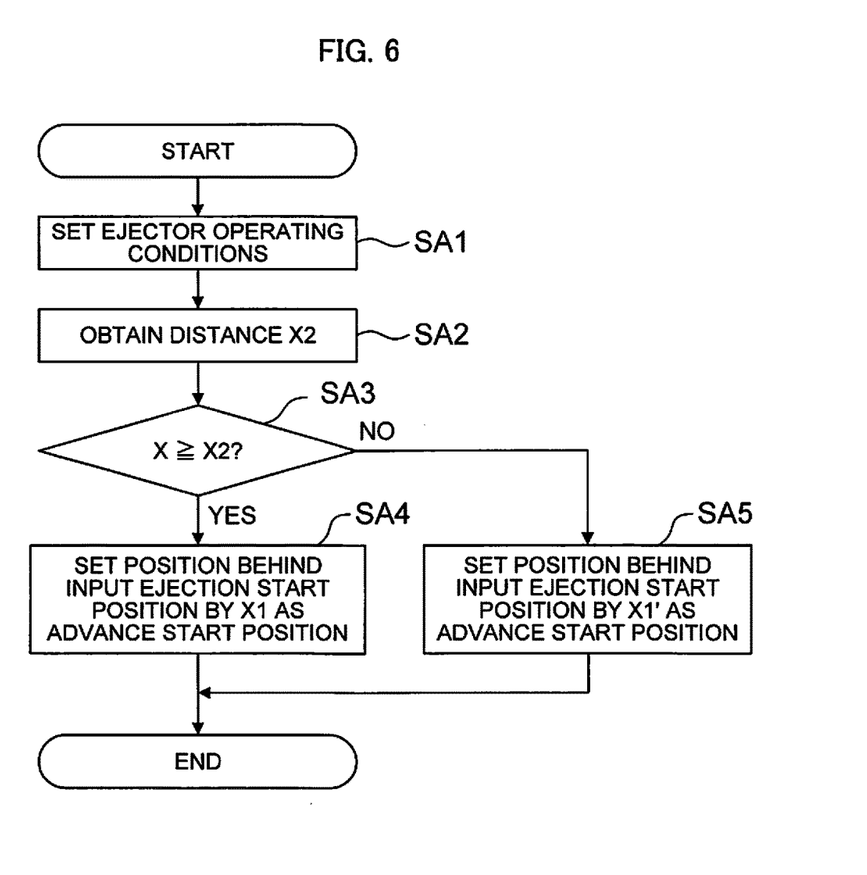
FIG. 6 is a flowchart showing an operation according to the present embodiment.

FIG. 6 is a flowchart showing an operation according to the present embodiment. The following is a sequential description of steps of the operation.

(Step SA1) Ejector operating conditions are set.

(Step SA2) The deceleration distance X2, which is a distance for which the ejector moves before it stops as the speed is reduced from the standard advance speed Vc at the deceleration rate a2, is obtained based on the standard advance speed Vc, deceleration rate a2, and the like set as the ejector operating conditions.

(Step SA3) The distance X between the ejection start position and the advance limit position, which is the advance distance of the ejector, is compared with the deceleration distance X2, and it is determined whether or not there is a relation $X \geq X2$. If $X \geq X2$ is given (YES), the processing proceeds to Step SA4. If $X < X2$ is given (NO), the processing proceeds to Step SA5.

(Step SA4) The position behind the ejection start position by the distance X1 ($=Vc^2/(2 \times a1)$) is set as the advance start position of the ejector, whereupon the processing ends.

(Step SA5) The position behind the ejection start position by the distance $X1'$ ($=a2 \times X/a1$) is set as the advance start position of the ejector, whereupon the processing ends.

There is a molding method for high-cycle molding or the like in which ejection is started in the middle of mold opening so that the mold opening and ejection by an ejector are simultaneously performed. In this case, the timing of the start of the ejector ejection may sometimes be set in a mold opening position. If the ejector is advanced from the advance start position behind the ejection start position by the acceleration distance, the distance for which the mold moves during the time required for the ejector movement for the acceleration distance is obtained. The ejector may be designed to start advancing earlier by the time required for the ejector movement for the acceleration distance by retracting the mold opening position for the start of the ejector advance by the obtained distance toward the mold opening start.

In the embodiment described above, linear acceleration and deceleration with the constant acceleration rate a1 for acceleration and deceleration rate a2 for deceleration are given as an example. However, the present invention is not limited to the linear acceleration and deceleration and can be applied to various other models of acceleration and deceleration, such as the exponential-type model and the bell-type model. The present invention can also be applied to a case where time changes of the acceleration rate and the deceleration-time acceleration rate are set as acceleration and deceleration patterns.

In this case, the moving distance (deceleration distance) X2 covered before the ejector stops after being decelerated from the set standard advance speed Vc is obtained based on the acceleration/deceleration model, deceleration characteristics such as the deceleration-time acceleration rate, or the deceleration pattern. The distances X between the ejection start position and the advance limit position and the distance X2 are compared and two cases, $X \geq X2$ and $X < X2$, are examined individually. In the case of the relation $X \geq X2$, the distance (acceleration distance) X1 required for the acceleration to the standard advance speed Vc can be obtained based on the acceleration/deceleration model, acceleration characteristics such as the acceleration rate, or the acceleration pattern. In the case of the relation $X < X2$, the ejection start position passing speed at which the deceleration can be started at the ejection start position and the ejector can stop at the advance limit position is obtained based on the deceleration characteristics or the deceleration pattern. The moving distance (deceleration distance) $X1'$ required for the acceleration to the obtained ejection start position passing speed can be obtained based on the acceleration characteristics or the acceleration pattern.

Also, the present invention can be applied to a case where the time constants of acceleration and deceleration are set in place of the values of the acceleration rate and the deceleration-time acceleration rate.

Further, the present embodiment is arranged so that the ejector rod 20 and the ejector plate 22 can be separated from each other and the ejector rod 20 abuts against the ejector plate 22 at the acceleration rate a1. The ejector rod 20, ejector plate 22, and ejector pins 24 may be integrally constructed so that they can collectively be accelerated and abut against the molded article 30.

According to the present embodiment, the molded article can be reliably released from the mold as the overall advance speed of a projecting plate of the mold is actually increased. Consequently, the molded article can be prevented from adhering again to the mold due to generation of static electricity after mold release, depending on its material and shape.

If gate cutting is performed in the mold, moreover, the ejector advance distance for the cutting is short in many cases. According to the present embodiment, a cut pin can be advanced at optimal timing and in a time as short as possible. This method is advantageous if the molded article is so thin-walled that its resin is quickly solidified and becomes hard to cut, or if deformation of a cut portion causes a problem. If the timing of the advance of the ejector is simply quickened, residual pressure remains in the resin, so that the cut pin of the mold receives a force and is damaged thereby. If the cutting takes time, the resin is inevitably solidified, so that the cutting cannot be achieved in some cases.

Further, the present embodiment is also useful in compressing the molded article in the mold. In molding thin-walled molded articles or lenses that require high transcription, compression should be achieved in a short time. If the timing of the ejector advance is simply quickened, however, a mold cavity cannot be well filled with a resin, so that an unfilled portion is inevitably formed. If the compression by the ejector advance is time-consuming, the resin may be solidified so that it cannot be compressed or the molded articles may be subjected to high residual stress in some cases.

Furthermore, a previous acceleration distance from the advance start position to the ejection start position of the ejector and a time required for movement for this distance are displayed on the operation screen of the injection molding machine. This display is helpful in deliberately adjusting molding conditions for optimal ejector advance timing.

The invention claimed is:

1. An injection molding machine, comprising:
an ejector;
ejector operating condition setting means for setting an advance limit position of the ejector, an ejection start position at which the ejector starts to eject a molded article, and a standard advance speed of the ejector for ejecting the molded article;
acquisition means for acquiring a set acceleration rate and a set deceleration rate of the ejector; and
ejector operation mode setting means for setting an operation mode of the ejector,
wherein the ejector operation mode setting means obtains, as an ejection start position passing speed, a passing speed in the ejection start position which enables the ejector to be decelerated at the deceleration rate and stop at the advance limit position, based on a deceleration distance as a moving distance covered by the ejector advancing at the standard advance speed from a start of the deceleration at the deceleration rate until the ejector stops, an ejection distance between the ejection start position and the advance limit position, and the standard advance speed,
an acceleration distance for acceleration at the acceleration rate to the ejection start position passing speed is obtained, and
a position behind the ejection start position by the acceleration distance is set as an advance start position of the ejector.

2. The injection molding machine according to claim 1, wherein the ejector operation mode setting means compares the deceleration distance and a distance between the ejection start position and the advance limit position, sets a speed equal to the standard advance speed as the ejection start position passing speed if the distance between the ejection start position and the advance limit position is longer than or equal to the deceleration distance, and obtains the ejection start position passing speed from the deceleration rate and the distance between the ejection start position and the advance limit position if the distance between the ejection start position and the advance limit position is shorter than the deceleration distance.

3. The injection molding machine according to claim 1, comprising a display device configured to display the acceleration distance and a time required for movement for the acceleration distance.

4. An ejector operating method for an injection molding machine with an ejector, the ejector operating method comprising:
setting, as ejector operating conditions, an advance limit position of the ejector, an ejection start position at which the ejector starts to eject a molded article, and a standard advance speed of the ejector for ejecting the molded article;
acquiring a set acceleration rate and a set deceleration rate of the ejector;
obtaining, as an ejection start position passing speed, a passing speed in the ejection start position which enables the ejector to be decelerated at the deceleration rate and stop at the advance limit position, based on a deceleration distance as a moving distance covered by the ejector advancing at the standard advance speed from a start of the deceleration at the deceleration rate until the ejector stops, an ejection distance between the ejection start position and the advance limit position, and the standard advance speed;
obtaining an acceleration distance for acceleration at the acceleration rate to the ejection start position passing speed; and
setting a position behind the ejection start position by the acceleration distance as an advance start position of the ejector.

5. The ejector operating method according to claim 4, wherein the deceleration distance and a distance between the ejection start position and the advance limit position are compared, a speed equal to the standard advance speed is set as the ejection start position passing speed if the distance between the ejection start position and the advance limit position is longer than or equal to the deceleration distance, and the ejection start position passing speed is obtained from the deceleration rate and the distance between the ejection start position and the advance limit position if the distance between the ejection start position and the advance limit position is shorter than the deceleration distance.

* * * * *